United States Patent
Courtin

[19]

[11] Patent Number: 6,155,762
[45] Date of Patent: Dec. 5, 2000

[54] FASTENERS SNAPPABLE ONTO A THREADED ROD AND USE THEREOF

[75] Inventor: Christian Courtin, Jouy le Moutier, France

[73] Assignee: ITW De France, Beauchamp, France

[21] Appl. No.: 09/368,906

[22] Filed: Aug. 6, 1999

[30] Foreign Application Priority Data

Aug. 7, 1998 [FR] France ................................. 98 10208

[51] Int. Cl.$^7$ .............................. F16B 21/00; F16B 37/08
[52] U.S. Cl. ........................ 411/512; 411/433; 411/437; 411/908
[58] Field of Search .................................... 411/433, 437, 411/508, 509, 512, 908

[56] References Cited

U.S. PATENT DOCUMENTS

| | | | |
|---|---|---|---|
| 4,547,108 | 10/1985 | Nakama . | |
| 4,828,444 | 5/1989 | Oshida | 411/437 |
| 5,302,070 | 4/1994 | Kameyama et al. . | |
| 5,332,347 | 7/1994 | Kimisawa | 411/437 X |
| 5,598,994 | 2/1997 | Olewinski et al. | 411/433 X |
| 5,816,762 | 10/1998 | Miura et al. | 411/437 X |
| 5,926,921 | 7/1999 | Benoit | 411/437 X |

FOREIGN PATENT DOCUMENTS

| | | |
|---|---|---|
| 2 534 646 | 4/1984 | France . |
| 196 28 461 | 1/1997 | Germany . |

*Primary Examiner*—Neill Wilson
*Attorney, Agent, or Firm*—Lowe Hauptman Gopstein Gilman & Berner

[57] ABSTRACT

An article has a tubular barrel (4) formed with a cavity and a catch (6) extending within a cavity window (5). A threaded rod (22) is adapted to be received in the cavity. In the absence of stress, the catch (6), in a rest position, has a wedge (12A) projecting inside the barrel (4). This wedge has a first inclined face (14) which faces the inlet opening (13) in the barrel and is inclined theretowards and towards the outside, and having a second face (15) which is opposed to the first and inclined in the opposite direction from the inlet opening (13) towards the outside. The catch (6) is adapted to tilt resiliently towards the outside when a force normal to the first inclined face (14) is applied thereto and to tilt resiliently inwards when a force normal to the second inclined face (15) is applied thereto. The article is used, when made of plastics material, with a threaded metal rod.

12 Claims, 2 Drawing Sheets

FASTENERS SNAPPABLE ONTO A THREADED ROD AND USE THEREOF

TECHNICAL FIELD

The invention relates to fastenes snappable onto a threaded rod.

BACKGROUND ART

It would be desirable to have a fastener which may be set in place with relatively moderate force and can withstands considerable extraction forces.

DISCLOSURE OF THE INVENTION

To this end, an article snappable onto a threaded rod, In accordance with the invention, a tubular barrel having a cavity to receive a threaded rod designed to be introduced coaxially therein through an inlet opening located at one end thereof. A window formed in the side wall of the barrel and a catch is connected to the barrel and disposed in the window. In the absence of stress, the article is in the rest position in which it has a wedge projecting inside the barrel. The wedge has a first inclined face which faces the inlet opening and is inclined theretowards and towards the outside, and a second inclined face which is opposed to the first face and is inclined in the opposite direction from the inlet opening and towards the outside. The catch is adapted to tilt resiliently towards the outside when a force normal to the first inclined face is applied thereto and to tilt resiliently inwards when a force normal to the second inclined face is applied thereto.

When the threaded rod is inserted into the bore in the barrel, the face of the thread oriented towards the distal end of the rod, and more precisely a portion of the face situated on the first turn of the thread meets the first inclined face of the wedge, which is similarly oriented, in such a way that the catch tilts resiliently towards the outside, which allows the first turn to move past the wedge, which latter is located in the space between the first and second turns of the thread, whereafter, if the movement inserting the rod into the barrel continues, the catch tilts once again towards the outside to permit the second turn and optionally more turns to move past the wedge.

The latter is thus located between two turns of the thread when the insertion movement is completed and, consequently, the second inclined face of the wedge faces a portion of the thread face oriented in the opposite direction from the distal end of the rod.

If the rod has a tendency towards withdrawal from the barrel, this portion of the thread face comes into contact with the second face of the wedge, which is of like orientation, in such a way that the catch tends to tilt towards the inside, that is to say towards the centre of the rod, in precisely the opposite direction from that which would permit the turn of the thread to move past the wedge.

The rod withdrawal movement is thus blocked by the obstacle constituted by the wedge.

The insertion force of the barrel on the threaded rod, required to effect snapping, may be very weak, in view of the leverage which it is in practice possible to obtain to make the catch tilt, while the force required for extraction may be particularly great, since the way is blocked by an obstacle which opposes it.

According to preferred characteristics, the catch has a second similar wedge, axially offset with respect to the first wedge by a distance corresponding to the pitch of the thread of said rod.

When the movement inserting the rod into the barrel is complete, each of the two wedges is located between two turns of the thread and, if the rod has a tendency to withdrawal from the barrel, the thread comes into contact with the second inclined face of each of the two wedges, in such a way that the force which the thread exerts on the catch is distributed over a relatively large surface area, which reduces the risk of the pressure exerted by the thread on the catch destroying the portions thereof which are in contact with the thread.

According to other preferred characteristics, the article comprises a stop for preventing the catch from tilting inwards by more than a predetermined amount.

When the catch comes to rest on the stop, the latter absorbs some of the force exerted on the catch, which prevents excessive stress on the connection between the catch and the barrel.

According to other preferred characteristics, the internal diameter of the barrel corresponds to the external diameter of the thread of the rod.

Withdrawal of the rod from the barrel is thus prevented not only by the obstacle composed of the wedge(s), but also by the fact that the thread bears against the inner surface of the barrel on the opposite side from the catch, which occurs, due to the identical diameters, as a result of the thrust exerted on the rod by the catch.

If the threaded rod is metal with the barrel made of plastic, the thread has a tendency to become embedded in the wall of the barrel. This slight penetration of the thread into the plastics provides a considerable retaining force, but without preventing disassembly, which may be effected by unscrewing.

According to other preferred characteristics, the catch is connected to the barrel by an end located on the side of the inlet opening.

Such positioning of the connection between the catch and the barrel provides the particular advantage of allowing tilting of the catch in the desired direction to be achieved in a particularly simple and convenient manner.

Preferably, for reasons of convenience of production and quality of the results obtained:
  the catch is connected to said barrel by a thin portion connected to the edge of the window; and optionally
  the thin portion is connected to the edge of the window on the outside; and optionally
  the edge of the window comprises a tooth disposed on the inside with respect to the thin portion, the catch being adapted to come to rest against the tooth when it has tilted from said rest position by a predetermined amount.

According to other preferred characteristics, the article comprises a support head to which the barrel is connected on the opposite side from the inlet opening.

The article may thus serve to sandwich between its support head and a supporting member, on which there is disposed a projecting threaded rod, an element having a hole in which there may be accommodated the threaded rod and the barrel of the article snapped onto the rod.

According to other preferred characteristics, to facilitate disassembly the article comprises a head provided with a socket for an unscrewing tool, the head being connected to said barrel on the opposite side from the inlet opening.

According to other preferred characteristics, the article is made of moulded plastics material.

The invention is also directed towards use of such an article with a threaded metal rod.

BRIEF DESCRIPTION OF THE DRAWINGS

The invention will now be further disclosed by means of the description of an exemplary embodiment, provided below by way of non-limiting example, with reference to the attached drawings, in which.

BEST MODE FOR CARRYING OUT THE INVENTION

Figure 1:
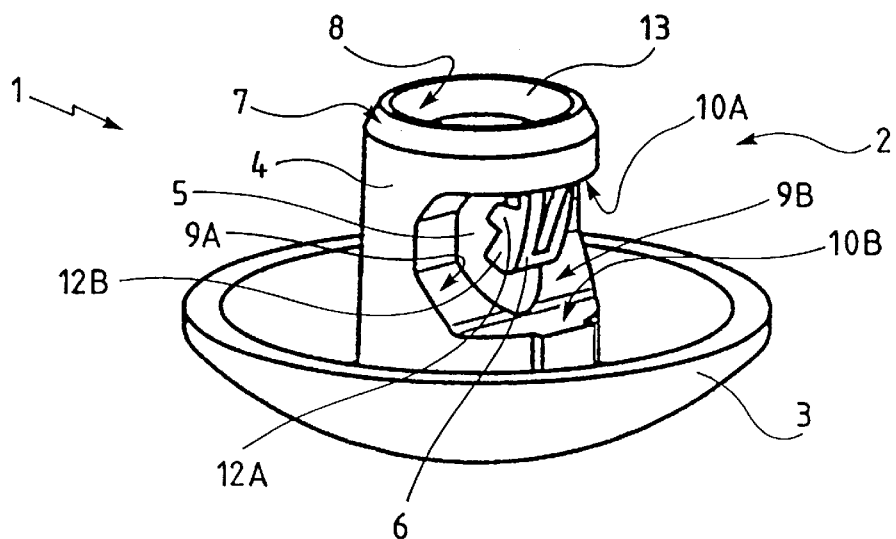
FIG. 1 is a perspective view of an article according to the invention.
Figure 2:
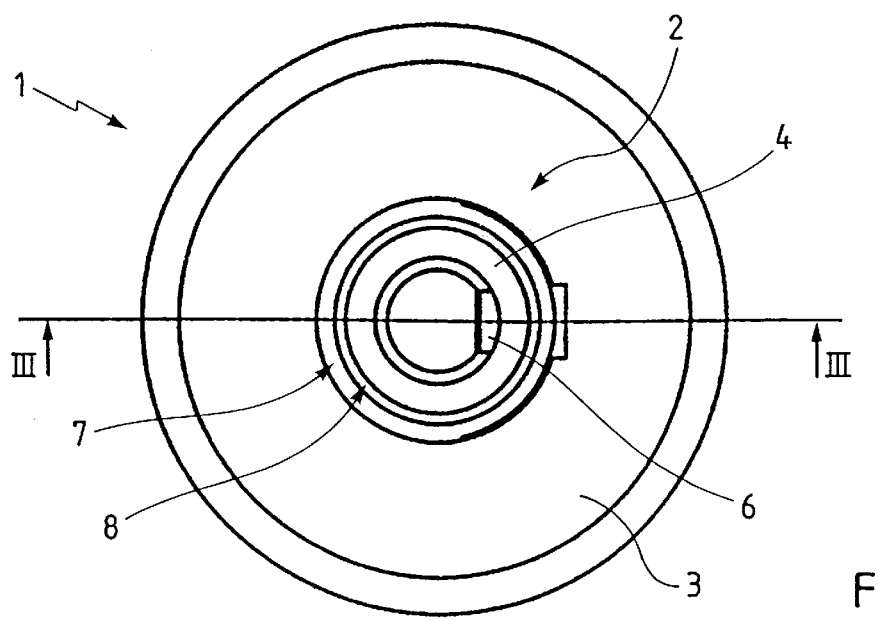
FIG. 2 is a plan view.
Figure 3:
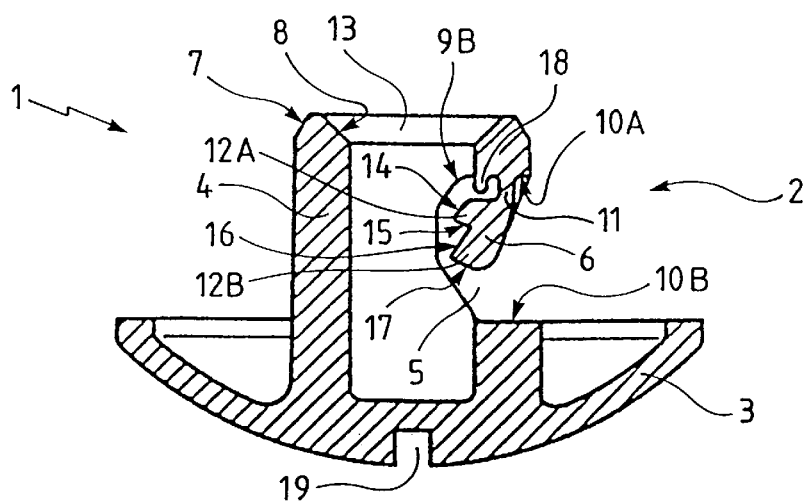
FIG. 3 is the sectional view taken along the line III—III in FIG. 2.
Figure 4:
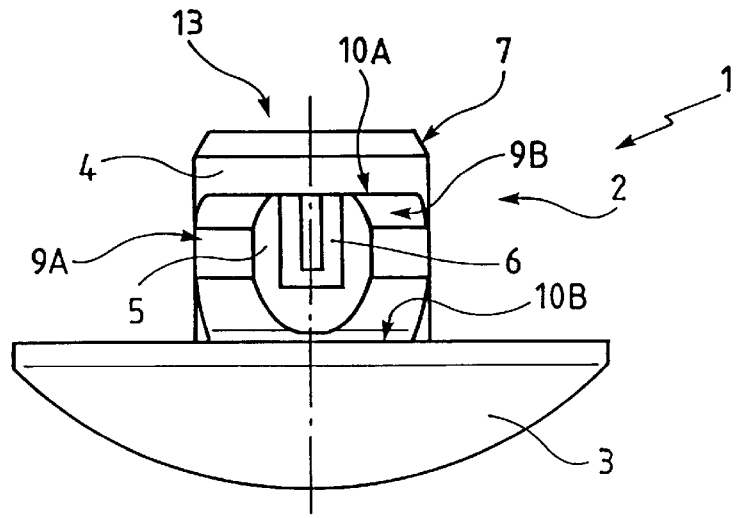
FIG. 4 is an elevational view of the article.

The article 1 is made in one piece of moulded plastics material, and comprises a foot 2 and a head 3.

The foot 2 comprises a tubular barrel 4, in the side wall of which there is formed a window 5, in which there is disposed a catch 6.

The barrel 4 is of a generally cylindrical shape. At the distal end thereof, an external chamfer 7 and an internal chamfer 8 are formal. In the thickness of the side wall, the surfaces which define the edge of window 5, comprise two sets of surfaces 9A and 9B of generally longitudinal orientation and overall in the shape of a C, and two surfaces 10A and 10B oriented transversely.

The catch 6 is connected to the barrel 4 by a relatively thin portion 11 of material (FIG. 6) which extends between the end of the catch visible at the top in the drawings and the surface 10A of the edge of the window 5. Portion 11 is located on the outside of surface 10A, with only a small triangular reinforcing rib being provided further to the outside than the portion 11.

On the inside, the catch 6 comprises two wedges 12A and 12B, which project into the barrel 4 in the absence of stress on the catch 6, the latter thus assuming the rest position illustrated in FIGS. 1 to 4.

Figure 5:
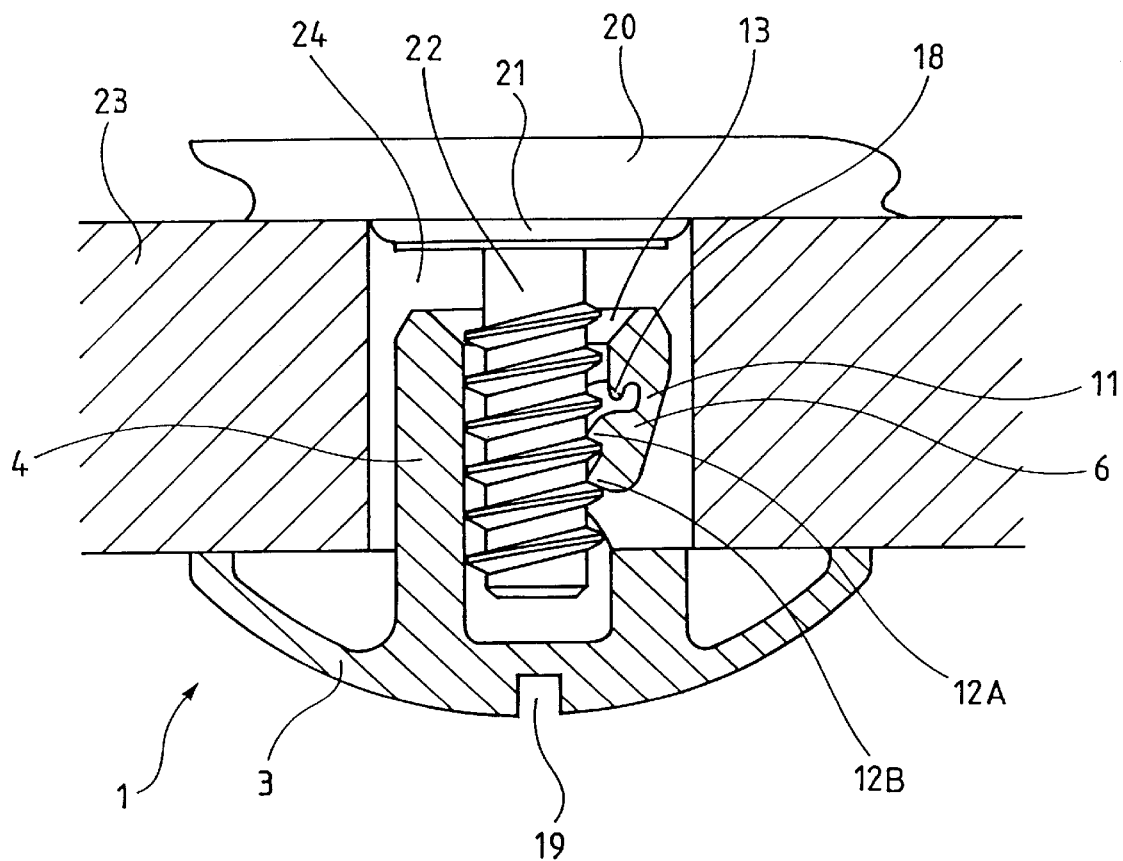
FIG. 5 is an elevational/sectional view similar to FIG. 3, showing the article being snapped onto the threaded rod of a screw welded onto a supporting member in order that an element to be fixed may be sandwiched between this supporting member and the head of the article.

As will be described in more detail below, the cavity of the barrel 4 serves to receive a threaded rod such as is illustrated in FIG. 5, insertion of the rod into the cavity being effected coaxially via the distal opening 13 situated at the end visible at the top in the drawings.

Overall, the wedges 12A and 12B are alike and are offset axially by a distance corresponding to the pitch of the thread of the rod designed to be accommodated in the cavity of the barrel 4.

The wedge 12A has a ridge, on either side of which there respectively extends a surface 14 and a surface 15, the surface 14 being inclined towards the opening 13 and towards the outside, while the surface 15 is inclined in the opposite direction from the opening 13 and towards the outside; and, likewise, the wedge 12B comprises a ridge, on either side of which there extend surfaces 16 and 17, the surface 16 being joined to the surface 15 by the opposite end from that which forms a ridge with the surface 17, the surfaces 16 and 17 being respectively parallel with the surfaces 14 and 15, the surface 16 being longer than the surface 14.

As a result of the arrangement of the wedges 12A and 12B relative, in particular, to the thin portion 11, the catch 6 tilts towards the outside if there is exerted on the surface 14 or the surface 16 a force normal to that surface, while it tilts towards the inside if there is exerted on surface 15 or the surface 17 a force normal to that surface.

On the inside of the surface 10A of the edge of the window 5 there is provided a tooth 18 (FIG. 3) on which the catch 6 comes to rest when it has tilted towards the inside by a predetermined amount.

On the opposite side from the opening 13, that is to say on the side visible at the bottom in the drawings, the barrel 4 is connected to the head 3, which takes the form of a spherical cap and exhibits a degree of flexibility which allows it to be deformed resiliently.

A groove 19 is formed at the centre of the head 3 to provide a socket for a screwdriver serving to disengage the article 1 from the threaded rod on which it has been positioned.

The support member 20 shown in FIG. 5, for example an automobile chassis component, is provided with a screw, the head 21 of which is mounted, here by welding, on the supporting member 20, and the stem 22 of which consequently projects with respect to the supporting member 20.

The article 1 serves to fix to the supporting member 20 a flat element 23 comprising a hole 24 into which the barrel 4 may be inserted.

An explanation will now be provided as to how the article 1 is used to fix the element 23 to the supporting member 20.

First, the element 23 is positioned against the supporting member 20 with the stem 22 and the head 21 of the screw accommodated in the hole 24.

The article 1 is then positioned so that the cavity of the barrel 4 is aligned with the rod 22, with the opening 13 at the front, whereafter pressure is exerted on the head 3 to insert the barrel 3 into the hole 24 while the rod 22 is inserted into the cavity in the barrel 4.

During this insertion movement, a portion of the face of the thread of the rod 22 which is oriented towards the distal end of said rod, and more precisely a portion of this face which is situated on the first turn of the thread, meets the surface 14 of the wedge 12A, which is similarly inclined, in such a way that it exerts on the surface 14 a force normal thereto. The catch 6 thus tilts towards the outside and the first turn of the thread moves past the wedge 12A and into a position between the first and second turns, while the face 16 of the wedge 12B comes into contact with the first turn of the thread, the interaction between the thread and the faces 14 and 16 allowing the insertion movement to be continued until the position illustrated in FIG. 5 is reached, in which the catch has tilted towards the outside three times, allowing the wedge 12A to move past the first three turns and the wedge 12B to move past the first two turns.

To complete assembly and to ensure that the element 23 is gripped between the supporting member 20 and the head 3 of the article 1, insertion of the article 1 is continued, in such a way that the wedges 12A and 12B each move past a new turn of the thread of the rod 22 while the head 3 is resiliently flattened.

Withdrawal of the rod 22 from the cavity of the barrel 4, and thus withdrawal of the barrel 4 from the hole 24 is prevented by the wedges 12A and 12B of the catch 6, the force which the face of the thread of the rod 22 oriented towards the head 21 exerts normally on the faces 15 and 17 of these wedges causing the catch 6 to tilt towards the inside, that is to say in the opposite direction from the tilting which would allow release of the rod 22 from the obstacles composed of the wedges 12A and 12B.

In the event of particularly strong forces, the catch 6 comes to rest on the tooth 18, which serves as a stop therefor, preventing it from tilting towards the inside by too large an amount and absorbing some of the force, which relieves the thin portion 11 accordingly.

It will be noted that the internal diameter of the cavity of the barrel 4 corresponds to the external diameter of the thread of the rod 22, which results in the tilting force exerted on the rod 22 by the catch 6 pushing the thread of the rod against the inner surface of the cavity of the barrel 4 on the opposite side from the catch 6, which contributes to preventing withdrawal of the rod 22 from the cavity of the barrel 4 by simple friction, or even by the threads' becoming slightly embedded in the material of the barrel.

It may be seen that only a relatively slight amount of force is required to set the article 1 in place, since it is sufficient to cause the catch 6 to tilt towards the outside and to flatten the head 3 at the end of the movement, while an extremely strong force is required, which would partially destroy the article 1, to achieve extraction of the rod 22 from the cavity 4.

Non-destructive disassembly of the article 1 may be achieved, however, by using a screwdriver which is positioned in the groove 19.

In a variant which is not shown, the face of the catch 6 which faces the tooth 18 comprises a cavity in which the catch 6 engages when it comes to rest on the tooth, in order better to immobilise the catch 6 when a strong extraction force is exerted.

Numerous other variants are possible, depending on the circumstances, and it will be remembered in this respect that the invention is not limited to the examples described and illustrated.

What is claimed is:

1. Article snappable onto a threaded rod, comprising:
   a tubular barrel (4) having a cavity adapted to accommodate said threaded rod (22) introduced coaxially therein via an inlet opening (13) situated at one end of said cavity;
   a window (5) formed in a side wall of said barrel (4); and
   a catch (6) connected to said barrel (4) and disposed in said window (5), wherein, in the absence of stress, said catch is disposed in a rest position in which it has a wedge (12A) projecting inside said barrel (4), said wedge (12A) having a first inclined face (14) which faces the inlet opening (13) and is inclined theretowards and towards the outside, and having a second inclined face (15) which is opposed to the first and is inclined in the opposite direction from the inlet opening (13) and towards the outside, said catch (6) being adapted to tilt resiliently towards the outside when a force normal to said first inclined face (14) is applied thereto and to tilt resiliently inwards when a force normal to the second inclined face (15) is applied thereto, wherein said window is formed with edges defining the window opening that extends sufficiently into the barrel to expose the wedge and said first and second inclined faces when viewed through the window from a direction substantially parallel to said first and second inclined faces.

2. Article according to claim 1, wherein said catch (6) has a second similar wedge (12B), axially offset with respect to the first wedge (12A) by a distance corresponding to the pitch of the thread of said rod (3).

3. Article snappable onto a threaded rod, comprising a tubular barrel (4) having a cavity adapted to accommodate said threaded rod (22) introduced coaxially therein via an inlet opening (13) situated at one end of said cavity; a window (5) formed in a side wall of said barrel (4); and a catch (6) connected to said barrel (4) and disposed in said window (5), wherein, in the absence of stress, said catch is disposed in a rest position in which it has a wedge (12A) projecting inside said barrel (4), said wedge (12A) having a first inclined face (14) which faces the inlet opening (13) and is inclined theretowards and towards the outside, and having a second inclined face (15) which is opposed to the first and is inclined in the opposite direction from the inlet opening (13) and towards the outside, said catch (6) being adapted to tilt resiliently towards the outside when a force normal to said first inclined face (14) is applied thereto and to tilt resiliently inwards when a force normal to the second inclined face (15) is applied thereto, further comprising a stop (18) formed on the barrel for preventing said catch (6) from tilting inwards by more than a predetermined amount.

4. Article according to claim 1, wherein an internal diameter of said barrel (4) corresponds to an external diameter of the thread of said rod (22).

5. Article according to claim 1, wherein said catch (6) is connected to said barrel (4) at an end of said catch located on a side of the inlet opening (13).

6. Article snappable onto a threaded rod, comprising:
   a tubular barrel (4) having a cavity adapted to accommodate said threaded rod (22) introduced coaxially therein via an inlet opening (13) situated at one end of said cavity;
   a window (5) formed in a side wall of said barrel (4); and
   a catch (6) connected to said barrel (4) and disposed in said window (5),
   wherein, in the absence of stress, said catch is disposed in a rest position in which it has a wedge (12A) projecting inside said barrel (4), said wedge (12A) having a first inclined face (14) which faces the inlet opening (13) and is inclined theretowards and towards the outside, and having a second inclined face (15) which is opposed to the first and is inclined in the opposite direction from the inlet opening (13) and towards the outside, said catch (6) being adapted to tilt resiliently towards the outside when a force normal to said first inclined face (14) is applied thereto and to tilt resiliently inwards when a force normal to the second inclined face (15) is applied thereto, wherein said catch (6) is connected to said barrel (4) at an end of said catch located on a side of the inlet opening (13), wherein said catch (6) is connected to said barrel (4) by a thin portion (11) connected to an edge (10A) of said window (5).

7. Article according to claim 6, wherein said thin portion (11) is connected to the edge (10A) of the window (5) on the outside portion thereof.

8. Article according to claim 7, wherein the edge (10A) of the window (5) comprises a tooth (18) disposed on an inside portion of the window with respect to said thin portion (11), said catch (6) being adapted to come to rest against said tooth (18) when it has tilted from said rest position by a predetermined amount.

9. Article according to claim 1, further comprising a support head (3) to which said barrel (4) is connected on an end of the barrel opposite the inlet opening (13).

10. Article according to claim 9, said head including a socket (19) for an unscrewing tool.

11. Article according to claim 1, said barrel being made of moulded plastics material.

12. Article according to claim 11 said threaded rod being a threaded metal rod.

* * * * *